March 5, 1946.    W. N. MILLAR    2,396,189
AIRCRAFT FLOATS
Filed May 3, 1943    2 Sheets-Sheet 1
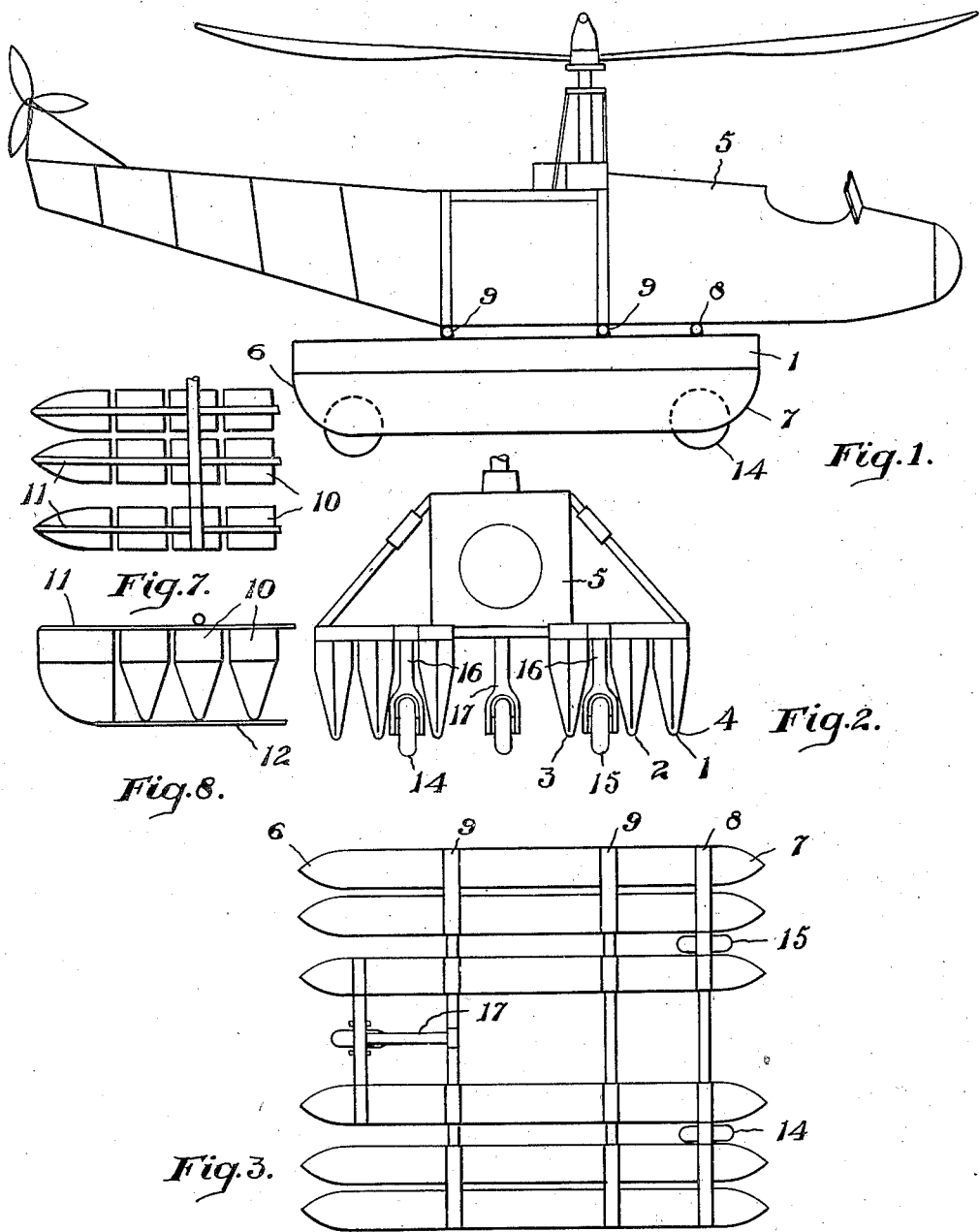

March 5, 1946. W. N. MILLAR 2,396,189
AIRCRAFT FLOATS
Filed May 3, 1943 2 Sheets-Sheet 2

Inventor.
W. N. Millar

Patented Mar. 5, 1946

2,396,189

UNITED STATES PATENT OFFICE 2,396,189

AIRCRAFT FLOAT

William N. Millar, Toronto, Ontario, Canada

Application May 3, 1943, Serial No. 485,530

1 Claim. (Cl. 244—105)

The present invention relates to improvements in the landing equipment for aircraft of the helicopter or vertical lift and descent heavier-than-air aircraft machines which will greatly facilitate the machine alighting upon water as well as the ground and providing float-supported means which will enable the craft to be maneuvered upon water and will facilitate rising therefrom.

The principal object of the invention is to provide a type of float which will enable a heavier-than-air aircraft to settle vertically onto a water surface so that impact shocks will be substantially eliminated and which will permit of the ready maneuvering of the craft on the water surface and will support the craft without assistance.

A further object is to provide a float having the above characteristics which will however permit the craft to rise vertically or substantially so from the water with the least possible resistance and therefore the least expenditure of power.

The principal feature of the invention consists in the provision of floats formed of multi-cellular construction, each of which is formed with tapering walls and such cells are spaced from one another to permit the free escape of air entrapped between the cells when the float engages a water surface.

A further feature of importance consists in the arrangement of the multiple cellular floats so that they may be displaced from a laterally extending position for sustaining the weight of the aircraft to a position beneath the body of the aircraft so that their surface areas will not impede the flow of air to and from the propeller. The floats when retracted will not interfere with the pilot's downward vision.

A still further feature of the invention consists in the provision of means for assisting maneuverability of the aircraft when resting upon ground or water surfaces.

In the field of aeronautics several types of vertically maneuverable machines have been devised. These have become known as "autogiros" and "helicopters." Several types of helicopters have been devised, some of which are provided with a propeller arranged centrally of the width of the aircraft and others have propellers arranged on laterally projecting portions of the aircraft frame.

The present invention is applicable to any of the types of vertically maneuverable craft.

In the accompanying drawings

Figure 1 is a side elevational view of a helicopter to which the present invention is applied, the drawings being in diagrammatic form.

Figure 2 is a part front elevational view of the structure illustrated in Figure 1.

Figure 3 is a plan view of the landing float structure illustrated in Figures 1 and 2.

Figure 7 is a part plan view of a further modified form of float.

Figure 8 is an elevational view of the structure illustrated in Figure 7.

Figure 4:
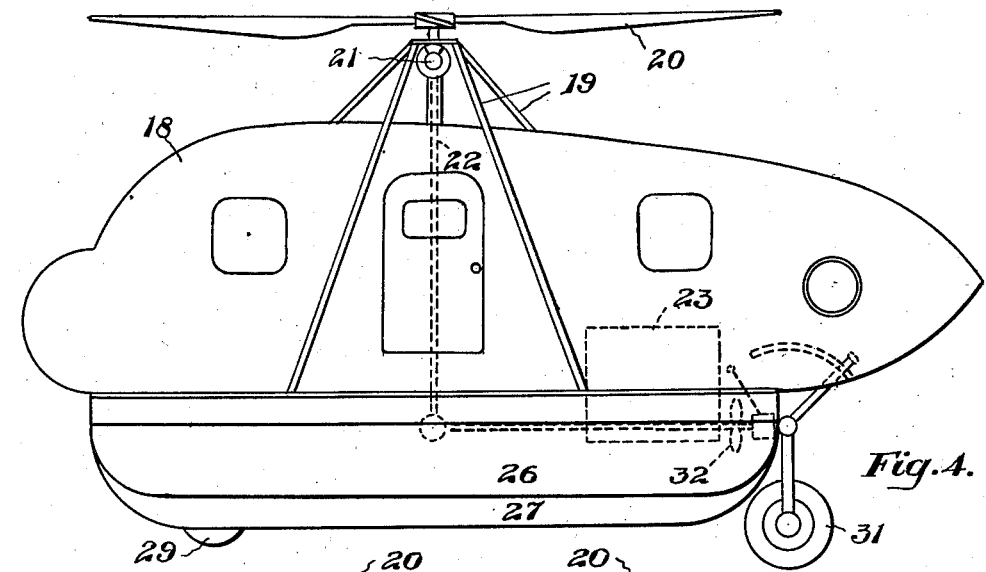
Figure 4 is a diagrammatic side elevational view of a different type of helicopter from that illustrated in Figure 1 and showing the application of my present invention.

In the types of autogiros and helicopters known they have been provided with wheeled landing gear for landing on ground surfaces, and other have been provided with floats arranged on either side of the frame structure, and a seaplane type of aeroplane has been provided with floats of boat-like structure particularly adapted for the running landing upon water surfaces at sea.

The helicopter type of aircraft is particularly adapted for a substantially straight upward lift from its landed poistion, and with floats large enough to support the weight of the machine the surface adhesion or suction developed in a straight upward lift is such that a very heavy stress is imposed on the engine and the frame structure.

The present invention has been devised to overcome such difficulties and also to obviate the impact shocks in landing of such craft on water where a large area of float is exposed to surface contact with the water.

In carrying the present invention into effect I propose to divide the float into a number of individual units or cells which will be rigidly fastened together and each cell will have downwardly converging surfaces which, upon striking the water, will part the same, thereby creating a gradual immersion.

In the form of the invention illustrated in Figures 1, 2 and 3 I have shown an arrangement of a plurality of long narrow cell-like ficats, 1, 2 and 3, the side walls of which preferably extend parallel for a short distance from the top and then converge downwardly to an edge 4. These floats are preferably parallelly arranged in groups at either side of the body 5 of the helicopter.

The ends 6 and 7 of each of the floats 1, 2, 3 are preferably tapered inwardly and the bottom corners of these ends are preferably rounded so that there will be no sharp corner projections to strike upon small objects with which they might possibly come into contact and cause injury.

The floats 1, 2, 3 are preferably secured to rigid cross bars 8 and 9 which form part of the body frame. The floats 1, 2 and 3 are spaced apart at either side of the machine and extend outwardly well beyond the body to give stability to the structure when it is resting upon a water surface, and there is sufficient buoyancy in these floats, which are of a hollow construction may be made of metal or other suitable material, and said floats are spaced apart so that when the machine alights upon a water surface the sharp bottom edges enter the water freely and the air and water trapped between the floats flows upwardly and escapes through the openings at the top. The floats thus strike and part the water and then settle smoothly into place without entrapping air and the immersion of the edges presents a gradual resistance which, through the tapering bodies, increases rapidly but without imparting injurious shocks to the machine.

It will be readily appreciated that when the machine is about to "take off" the application of the lifting forces through the operation of the propellers lifts the narrow, cell-like floats from the water without creating any appreciable restraining suction, such as would occur with large-bodied floats of the boat-type such as used in seaplanes, and the tapering of the floats permits a gradual release from the water, with air flowing into the spaces between the floats to prevent any trapping.

The floats being preferably long and narrow and tapered on the bottom and provided with curved edges at the front and rear, will enable the machine to come down on a water surface even though it may be moving forwardly or rearwardly without danger of damage to the floats and they will present cutwaters at the tapering ends which will enter the water freely.

A modification of the float cells shown in Figures 1, 2 and 3 is illustrated in Figures 7 and 8 where the longitudinal structures are divided transversely and actually constitute a plurality of inverted pyramid-shaped cells 10. These are preferably connected together by a longitudinal top bar 11 and a longitudinal bottom bar 12 which may be welded or otherwise secured in position.

It is preferred that the end cells 13 be rounded to form prow or stem-like cutters and are similar to the ends of the floats 1, 2 and 3.

Machines of the type referred to may be required to be landed upon the ground or upon the decks of boats and in order that this may be accomplished without damage to the float structures I have shown in Figures 1, 2 and 3 an arrangement of supporting wheels. The forward wheels 14 and 15 are arranged in suitable fork-like structures 16 which may be connected to the cross bars 9.

A centrally arranged fork 17 is mounted on the rear cross bar 9 and extends between the inside floats of the sets arranged on either side of the structure. Thus a three-point landing gear with rolling contacts is provided in which the suitably tired wheels extend a sufficient distance below the bottom edges of the floats to engage ordinary smooth-landing surfaces.

Figure 5:
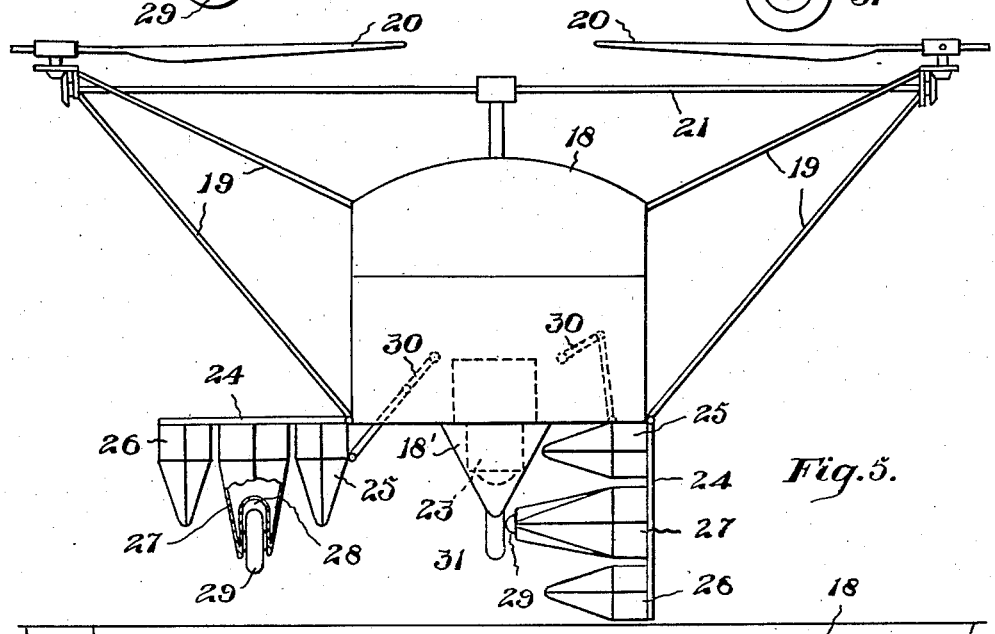
Figure 5 is an end elevational view of the structure illustrated in Figure 4 showing one of the floats in a retracted position beneath the body of the aircraft.
Figure 6:
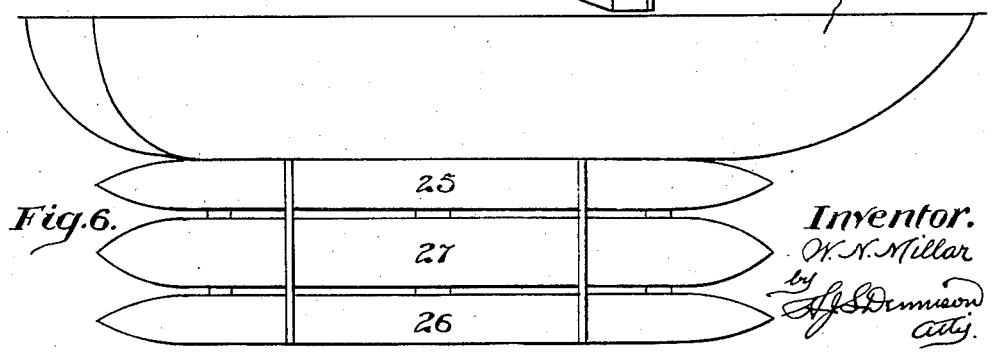
Figure 6 is a half plan diagram of the craft illustrated in Figure 6 showing one of the float structures extended therefrom.

A structure such as described may be effectively used on any of the known types of helicopters, but I have shown a modified arrangement of floats in Figures 4 and 5 which might be applied to the type of machine illustrated in Figure 1.

Figures 4 and 5 illustrate a type of helicopter in which the body 18 is preferably streamlined and it is provided with laterally extending outrigger frames 19 upon which are mounted the horizontally rotating propellers 20 which are shown driven from a cross shaft 21 operated from a vertical shaft 22 connected with the engine 23, though of course other means of propulsion may be devised.

The centre portion of the body structure is here shown provided with a V-shaped depressed portion 18' extending longitudinally thereof in which the crankcase of the engine 23 is mounted.

Arranged at either side of the body 18 and connected by suitable pivot or hinge connections thereto are laterally extending arms or bars 24 which may be arranged in pairs or in any suitable number and these may be connected together to form frames, and to each set of bars or frame is secured an arrangement of cellular floats.

In the arrangement shown the inner and outer floats 25 and 26 are substantially the same as the floats 1, 2 and 3, and between these paired floats are arranged larger floats 27 which are preferably of greater dimensions in width and in depth, and these larger floats are provided with wells or recesses 28 in which are housed suitable landing wheels 29. These are preferably arranged toward the forward end of the floats and suitable means is provided for swinging each of the hinged float units outwardly and inwardly, the means diagrammatically here shown being preferably in the form of an "oleo" leg 30.

These legs may be power or hand operated to swing the float units outwardly and to lock them in an outwardly extended position to present landing floats of a cellular structure which will part the water easily and allow the air entrapped between the floats to readily escape. These floats also being provided with wheeled extensions will enable the craft being landed on ground surfaces.

In addition to the wheeled supports 29 arranged within the wells formed in the floats a single centre dirigible wheel 31 is arranged adjacent to the rear end and this is adapted to be raised and lowered by any suitable gear. Such wheel may also be power-driven by any suitable form of transmission from the engine shaft. Such power-driven wheel will greatly facilitate the maneuvering of the craft on the ground.

In order to further facilitate the maneuverability of the craft, the engine shaft, which is preferably carried beyond the end of the V-shaped housing, may be provided with a propeller wheel 32, as illustrated in dotted lines in Figure 4. This propeller wheel will, when the craft is landed on a water surface, be immersed and be effectively used in maneuvering the craft over the water.

It will be readily appreciated that an aircraft of the vertical lifting type provided with floats such as described may land on water or on solid surfaces, and when the float structures are hinged in the manner described they may be retracted in the manner illustrated so that after the craft has left the surface on which it has been resting, these floats may be swung inwardly so that they will not offer any resistance to the up-and-down movement of the craft in its flying operation. Such landing gear may be quickly swung outwardly when the craft approaches a landing surface.

It will be understood that I have illustrated my invention only diagrammatically as many details of structure, both of the floats and of their supports and means for manipulating the same, will be subject to considerable alteration without departing from the spirit of the invention which is primarily to provide landing floats for vertically operable aircraft composed of a plurality of cellular floats grouped together in units to permit the ready escape of air from under the landing float surfaces and the ready access of air to the float surfaces to permit of their lifting from the water with the least possible resistance.

What I claim as my invention is:

An aircraft of the vertically operable type having laterally projecting frames, and a plurality of long, narrow floats closely spaced apart and rigidly secured to each of said frames, the longitudinal side walls of the underportions of each of said floats presenting converging surfaces, each of said long narrow floats being divided transversely into a plurality of sections longitudinally spaced apart.

WILLIAM N. MILLAR.